United States Patent [19]
Kitahara et al.

[11] Patent Number: 6,121,752
[45] Date of Patent: Sep. 19, 2000

[54] BATTERY UNIT HAVING A PLURALITY OF RECHARGEABLE BATTERY CELLS AND METHOD OF CHARGING THE SAME

[75] Inventors: Jun Kitahara; Masato Ishii, both of Yokohama; Kenichi Saitou, Tokyo; Junichi Miyata, Chiba; Hitoshi Takeoka, Owariasahi, all of Japan

[73] Assignee: Hitachi, Ltd., Tokyo, Japan

[21] Appl. No.: 09/493,237

[22] Filed: Jan. 28, 2000

Related U.S. Application Data

[63] Continuation of application No. 09/197,763, Nov. 23, 1998, abandoned.

[30] Foreign Application Priority Data

Nov. 21, 1997 [JP] Japan ..................... 9-321470

[51] Int. Cl.$^7$ .......................... H01M 10/44; H01M 10/46
[52] U.S. Cl. .................................................. 320/122
[58] Field of Search .................................. 320/116, 118, 320/119, 121, 122

[56] References Cited

U.S. PATENT DOCUMENTS 4,614,905  9/1986  Petersson et al. .................... 320/116

*Primary Examiner*—Edward H. Tso
*Attorney, Agent, or Firm*—Antonelli, Terry, Stout & Kraus, LLP

[57] ABSTRACT

A battery assembly unit and a method of charging the same for applying constant current/constant voltage charging to a battery assembly in which a plurality of battery cell groups each having battery cells each being rechargeable and increasable in electromotive force as charging proceeds are connected in series. There are provided a reference charging voltage circuit for generating charging reference voltages serving as voltages referenced to electromotive force levels of the individual battery cell groups on the basis of charging voltage applied across the battery assembly and changeable with time, and comparison circuits each adapted to compare an electromotive force level across each of the plurality of battery cell groups connected in series with the charging reference voltage. Further, bypass circuits are provided each of which connected in parallel across each of the plurality of battery cell groups connected in series and when an electromotive force of a battery cell group exceeds the charging reference voltage, bypasses the charging current by an amount corresponding to a difference.

12 Claims, 11 Drawing Sheets

(FOR ONE SET OF SECONDARY BATTERY CELLS)

FIG. 10

BATTERY PACK CHARGING CIRCUIT CONFIGURATION CONTROL TRUTH TABLE

| CHARGE/DISCHARGE | INPUT | | | | | OUTPUT | | | | | | | | | |
|---|---|---|---|---|---|---|---|---|---|---|---|---|---|---|---|
| | cut-a | cut-b | cut-c | cut-d | | out-1 | out-2 | out-3 | out-4 | out-5 | out-6 | out-7 | out-8 | v1 | v2 |
| H | L | L | L | L | | H | L | H | L | H | L | H | L | H | H |
| H | L | L | L | H | | H | L | H | L | H | H | L | H | H | L |
| H | L | L | H | L | | H | L | H | L | L | H | H | L | H | L |
| H | L | L | H | H | | H | L | H | H | H | L | H | H | L | H |
| H | L | H | L | L | | H | L | L | H | L | H | H | H | H | L |
| H | L | H | L | H | | H | L | H | H | H | L | L | H | L | L |
| H | L | H | H | L | | L | H | L | L | L | H | L | H | H | H |
| H | L | H | H | H | | L | H | H | L | H | H | H | L | H | L |
| H | H | L | L | L | | L | H | L | H | H | L | H | L | L | L |
| H | H | L | L | H | | L | H | H | H | L | H | L | H | L | H |
| H | H | L | H | L | | L | H | L | H | H | H | H | L | H | H |
| H | H | L | H | H | | L | H | H | L | L | L | H | H | L | H |
| H | H | H | L | L | | H | L | L | H | H | H | L | L | H | L |
| H | H | H | L | H | | H | L | H | L | H | L | H | H | H | L |
| H | H | H | H | L | | H | L | H | L | H | H | H | L | H | H |
| L | X | X | X | X | | H | L | H | L | H | L | H | L | X | X |

BATTERY UNIT HAVING A PLURALITY OF RECHARGEABLE BATTERY CELLS AND METHOD OF CHARGING THE SAME

This is a continuation of application Ser. No. 09/197,763, filed Nov. 23, 1998 abandoned, the entire disclosure of which is incorporated herein by reference.

BACKGROUND OF THE INVENTION

The present invention relates to a battery assembly unit or battery pack in which a plurality of chargeable (rechargeable) battery cells are connected in series and a method of charging the battery assembly unit or battery pack.

With reference to FIG. 12 showing, in schematic block form, a conventional battery assembly unit, the construction of a battery assembly and a charging control circuit will be described.

In the conventional chargeable battery assembly unit, as designated by reference numeral 10, a plurality of battery cell groups 30a, 30b, 30c and 30d each having a plurality of chargeable battery cells (secondary battery cells) connected in parallel with each other are connected in series with each other to form a battery assembly.

In the battery assembly unit as above, the battery cell groups are connected to the outside through a charge/discharge protective circuit 20 to prevent voltages of the individual battery cell groups from being used outside a range from a discharging end voltage (about 2.5V) to a charging end voltage (about 4.2V).

In order to examine whether the voltages of the respective battery cell groups are within the range between the discharging end voltage and the charging end voltage, voltage monitoring lines 90a, 90b and 90c for monitoring voltages at junction nodes of the respective battery cell groups are provided and the charge/discharge protective circuit 20 operates to stop discharging of the battery assembly when any of the battery cell groups reaches the discharging end voltage during discharging operation and stop charging of the battery assembly when any of the battery cell groups reaches the charging end voltage.

In this type of battery assembly unit, in order not to make the discharging end voltage or the charging end voltage different greatly for the individual battery cell groups, battery cells having the same characteristics are selected for the individual battery cell groups to form the battery assembly.

Under the circumstances as above, however, it happens that irregularity occurs in characteristics of the battery cell groups constituting the battery assembly, raising a problem that the life of the battery assembly becomes shorter than that of a single secondary battery.

Since, in this type of battery assembly unit, the battery cell groups are connected in series to cause the same charging current to flow through the individual battery cell groups during charging, all of the battery cells cannot be charged uniformly when the characteristics of the individual battery cell groups differ from each other.

When the characteristics of the respective secondary battery cells are not uniform and any one of the cells reaches the charging end voltage and shifts to undergo constant voltage charging, the charging current must differ for the individual second battery cells after the shifting to the constant voltage charging. But in the battery assembly in which the battery cell groups are connected in series, the same current flows through the respective battery cell groups, proving that this charging method is not optimal.

Conceivably, an insufficiently charged battery cell group is discriminated in the battery assembly and only the insufficiently charged battery cell group is kept to be charged. But, in this case, for discrimination of the insufficiently charged battery cell group, electromotive force levels of the individual battery cell groups need to be compared with each other.

Further, a charging current control circuit adapted to pass charging current to only the insufficiently charged battery cell group must be operated during charging operation only and is required not to have any influence upon the battery cell group during discharging operation.

In addition, when a battery cell group reaching the charging end voltage is separated from the charging circuit, charging voltage for charge of the remaining cells must be changed.

Furthermore, the increasing rate of electromotive force of the secondary battery cell during the constant current charging operation differs from that during the constant voltage charging operation and accurate measurement of voltage during the constant voltage charging operation is difficult to achieve.

SUMMARY OF THE INVENTION

The present invention contemplates elimination of the above problems and it is an object of the invention to provide a charging current control circuit which is for use with a battery assembly having a plurality of battery cell groups of secondary battery cells each being rechargeable for reuse and being increasable in electromotive force as charging proceeds, the plurality of battery cell groups being connected in series with each other, and which can permit charging operation while keeping electromotive force levels of the respective battery cell groups uniform, and to provide a method of charging the battery assembly.

Another object of the invention is to provide a battery assembly charging current control circuit capable of stopping supply of charging current to a battery cell group for which charging is completed during charging operation and capable of supplying the charging current to only battery cell groups for which charging is not completed.

Another object of the invention is to provide a charging voltage/current control circuit and a charging method which can change charging voltage for charge of remaining secondary battery cells when a secondary battery cell reaching the charging end voltage is separated from a charging circuit.

Still another object of the invention is to provide a charging current control circuit and a charging method which can make the increasing rate of electromotive force of secondary battery cells different for the constant current charging and the constant voltage charging to accurately detect a change in voltage during the constant voltage charging operation.

According to the present invention, to accomplish the above objects, in a charging current control circuit of a battery assembly in which battery cells each being rechargeable for reuse and increasable in electromotive force as charging proceeds are connected in series with each other, there is provided means for charging an insufficiently charged battery cell in a greater amount than other battery cells.

According to the present invention, in the battery assembly charging current control circuit, to make the plurality of battery cells connected in series in the battery assembly have the same electromotive force level, there is provided a charging current bypass circuit for bypassing at least a part of charging current for a battery cell having a higher electromotive force level than other battery cells.

According to the present invention, in the battery assembly charging current control circuit, means for comparison of electromotive force of battery cells compares voltages obtained by dividing a voltage applied across all of the battery cells connected in series by the number of the battery cells with electromotive force levels of the individual battery cells.

In the battery assembly charging current control circuit, the charging current bypass circuit bypasses charging current for any battery cell reaching the charging end voltage of the plurality of battery cells connected in series in the battery assembly.

In the battery assembly charging current control circuit, there is provided charging current bypass circuit invalidating means for invalidating the charging current bypass circuit when all of the battery cells reach the charging end voltage.

In the battery assembly charging current control circuit, there is provided battery assembly circuit configuration changing means for changing the circuit configuration of the battery assembly such that of the plurality of battery cells connected in series in the battery assembly, any battery cell reaching the charging end voltage is separated from the charging circuit and the charging current is passed to only insufficiently charged battery cells.

In the battery assembly charging current control circuit, there is provided charging voltage designating means for instructing changing of the charging voltage supplied to the battery assembly when the circuit configuration of the battery assembly is changed.

In the battery assembly charging current control circuit, when the circuit configuration of the battery assembly is changed, the battery assembly circuit configuration changing means changes the circuit configuration in accordance with predetermined procedures for temporarily stopping charging, changing the circuit configuration, instructing charging voltage and subsequently starting charging.

In the battery assembly charging current control circuit, a charge/discharge discriminative signal is delivered which discriminates whether the battery assembly is in charging operation or discharging operation and validates the charging control circuit during charging operation only.

In the battery assembly charging current control circuit, the sensitivity of the voltage comparison circuit during the constant current charging operation is made to be different from that during the constant voltage charging operation.

According to the invention, in a method of charging a battery cell assembly in which battery cells each being rechargeable and increasable in electromotive force as charging proceeds are connected in series, an insufficiently charged battery cell is charged in a greater amount than other battery cells.

In the battery assembly charging method, to make the plurality of battery cells connected in series in the battery assembly have the same electromotive force level, a part of charging current for a battery cell having a higher electromotive force level than other battery cells is bypassed.

In the battery assembly charging method, charging current for any battery cell reaching the charging end voltage of the plurality of battery cells connected in series in the battery assembly is bypassed.

In the battery assembly charging method, a charging current bypass circuit is invalidated when all of the battery cells reach the charging end voltage.

In the battery assembly charging method, the circuit configuration of the battery assembly is changed such that of the plurality of battery cells connected in series in the battery assembly, any battery cell reaching the charging end voltage is separated from the charging circuit and the charging current is passed to only insufficiently charged battery cells.

In the battery assembly charging method, a charging voltage designating signal for instructing changing of the charging voltage supplied to the battery assembly is delivered when the circuit configuration of the battery assembly is changed.

In the battery assembly charging method, when the circuit configuration of the battery assembly is changed, charging is stopped temporarily, the circuit configuration is changed, charging voltage is instructed and subsequently charging is started in accordance with predetermined procedures.

In the battery assembly charging method, a charge/discharge discriminative signal is delivered which discriminates whether the battery assembly is in charging operation or discharging operation and validates the charging control circuit during charging operation only.

In the battery assembly charging method, the sensitivity of voltage comparison is changed for the constant current charging operation and the constant voltage charging operation.

BRIEF DESCRIPTION OF THE DRAWINGS

FIG. 10 shows a truth table for use in the detailed structure of FIG. 9.

DESCRIPTION OF THE PREFERRED EMBODIMENTS

Figure 1:
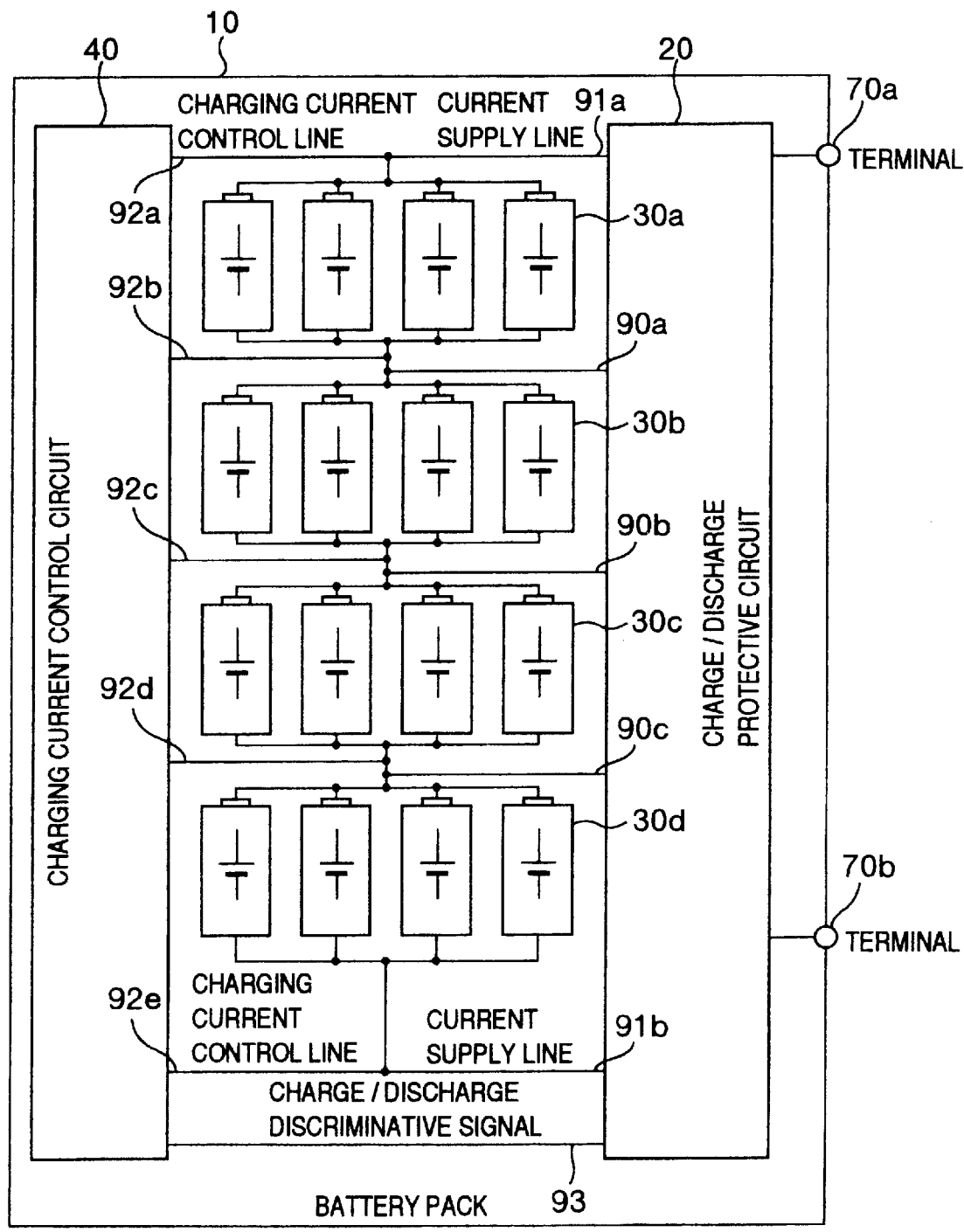
FIG. 1 is a schematic block diagram showing the construction of an embodiment of a battery assembly unit according to the present invention.
Figure 2:
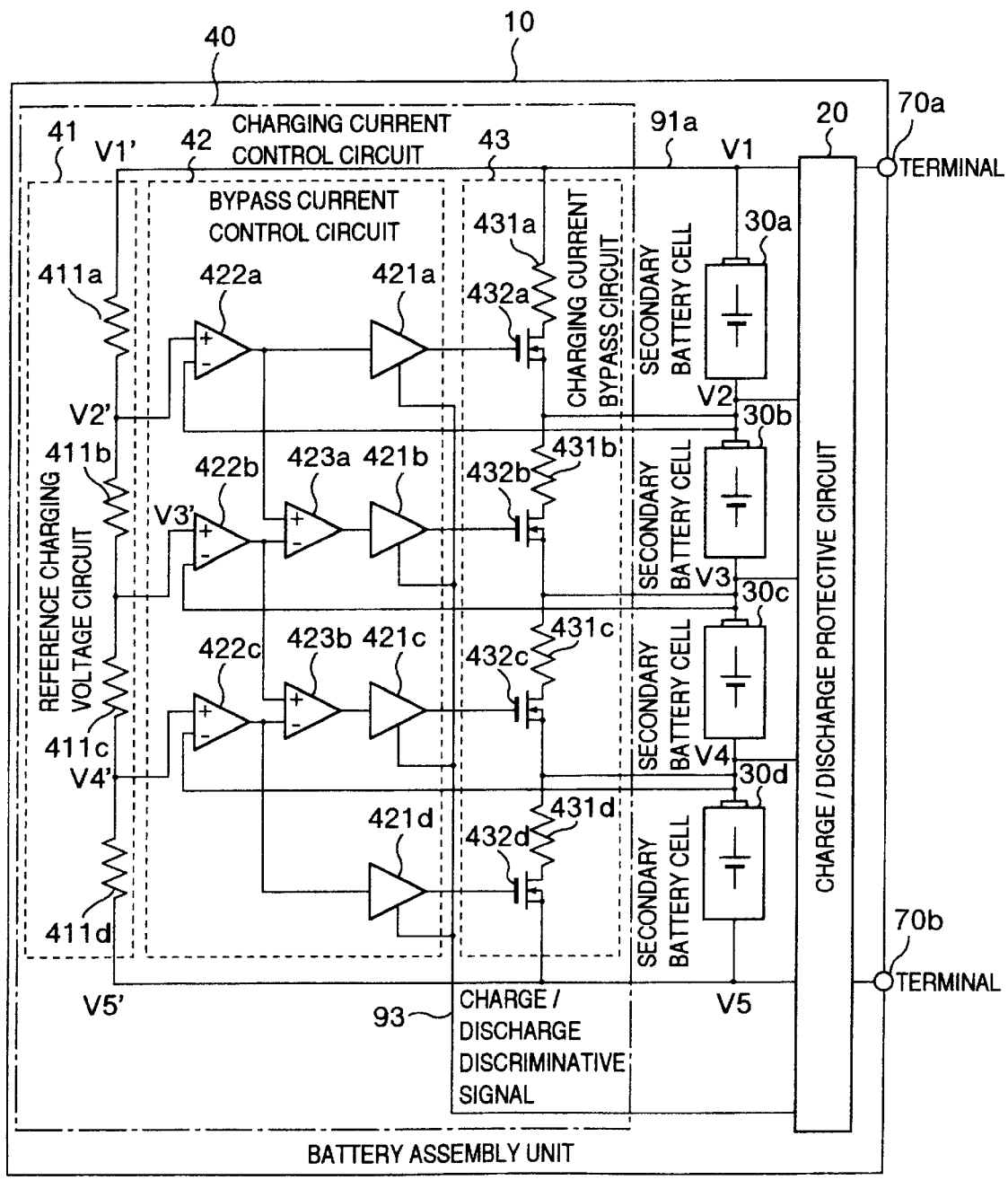
FIG. 2 is a block diagram for explaining details of a battery assembly charging current control circuit in the embodiment of FIG. 1.

Referring now to FIGS. 1 and 2, a first embodiment of a battery assembly charging current control circuit according to the present invention will be described.

A battery assembly unit or battery pack using the charging current control circuit according to the present invention is constructed as shown in schematic block form in FIG. 1.

The battery assembly unit, as designated by reference numeral 10, which is charged by means of the charging current control circuit according to the invention comprises a charge/discharge protective circuit 20, battery cell groups 30a, 30b, 30c and 30d each having a plurality of chargeable battery cells connected in parallel with each other, the charging current control circuit as designated by reference numeral 40, terminals 70a and 70b for supplying electric power to the outside or for externally receiving charging power, voltage monitoring lines 90a, 90b and 90c for monitoring terminal voltages of the battery cell groups 30a, 30b, 30c and 30d constituting a battery assembly and connected in series with each other, current supply lines 91a and 91b, charging current control lines 92a, 92b, 92c, 92d and 92e and a charge/discharge discriminative line 93.

In the present specification, the battery cell group having the plurality of chargeable battery cells connected in parallel with each other will sometimes be merely called a battery cell.

Figure 3:
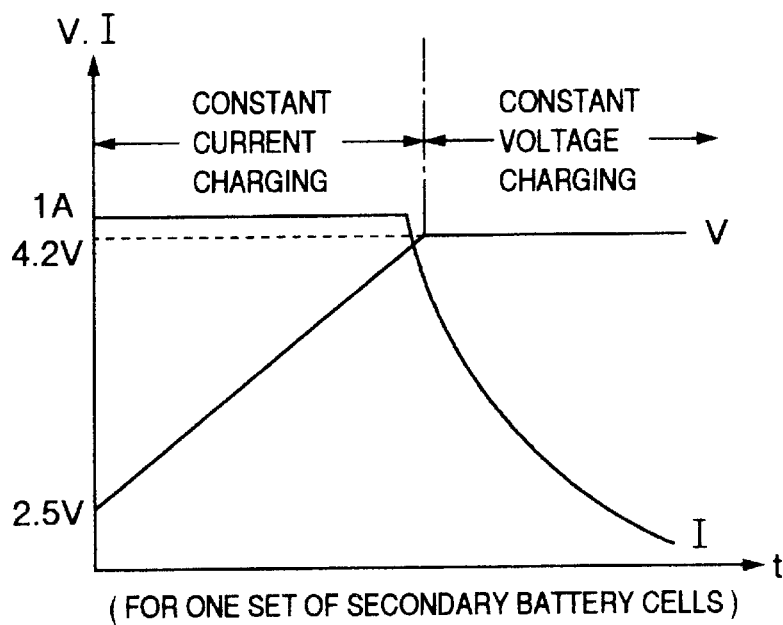
FIG. 3 is a graph showing constant current/constant voltage charging characteristics.

The battery assembly unit 10 is charged by applying a voltage for constant current/constant voltage charging as exemplified in FIG. 3 from an external charging circuit not shown. Charging current flows from the terminal 70a to the terminal 70b through charge/discharge protective circuit 20, current supply line 91a, battery cell groups 30a, 30b, 30c and 30d, current supply line 91b and charge/discharge protective circuit 20.

The charge/discharge protective circuit 20 has the function of monitoring electromotive force of each battery cell group so as to stop discharge of the whole of battery assembly when an electromotive force level any one of the battery cell groups reaches a discharging end voltage during discharging operation.

The charge/discharge protective circuit 20 also has the function of monitoring electromotive force of each battery cell group in order that when an electromotive force level of any one of the battery cell groups reaches a charging end voltage during charging operation, charging of all the battery cell group can be stopped.

Further, the charge/discharge protective circuit 20 also functions to make a discrimination between charging operation of the battery assembly and discharging operation thereof by detecting the flow direction of current in order to deliver the charge/discharge discriminative signal 93 which validates the charging current control circuit 40 during charging operation only.

The charging current control circuit 40 is connected to the charging current control lines 92a, 92b, 92c, 92d and 92e for bypassing the charging current of the respective battery cell groups connected in series. The charging current control line 92a is connected to a positive side terminal of the battery cell group 30a and the charging current control line 92e is connected to a negative side terminal of the battery cell group 30d. The charging current control lines 92b, 92c and 92d are respectively connected to junction nodes through which the battery cell groups 30a, 30b, 30c and 30d are connected in series with each other.

In the figure, 4 battery cell groups 30 each having 4 chargeable battery cells connected in parallel with each other are connected in series but the respective parallel connections may include a desired number of battery cells and a desired number of parallel connections may be connected in series.

Referring to FIG. 2, an embodiment of the charging current control circuit 40 according to the present invention will be described. Internal circuits of the charging current control circuit 40 are constructed as shown in schematic block form in FIG. 2.

In the figure, illustration of the parallel connection in each battery cell group 30 is simplified to take the form of a single secondary battery cell.

The charging current control circuit 40 includes a reference charging voltage circuit 41 for generating reference voltages for the respective battery cell groups, a bypass current control circuit 42 and a charging current bypass circuit 43.

The reference charging voltage circuit 41 has voltage divider resistors 411a, 411b, 411c and 411d.

In the reference charging voltage circuit 41, charging voltage applied across the whole of battery cell groups and increasing gradually from discharging end voltage to charging end voltage is divided uniformly.

When no current flows into input terminals of operational amplifiers 422a, 422b and 422c of the bypass current control circuit 42 (in the case where these operational amplifiers are ideal circuits from the theoretical viewpoint), the gradually increasing charging voltage can be divided uniformly by making resistances of the voltage divider resistors 411a, 411b, 411c and 411d equal to each other.

When currents flow into the input terminals of the operational amplifiers 422a, 422b and 422c of the bypass current control circuit 42 from the reference charging voltage circuit 41, the current flowing through the voltage divider resistors 411a, 411b, 411c and 411d decreases gradually as it proceeds to voltage divider resistors of lower stages. Accordingly, by increasing the resistance of voltage divider resistor gradually as the stage lowers, the charging voltage applied across the whole of battery cell groups can be divided uniformly.

As shown in FIG. 2, it is now assumed that potential levels resulting from voltage division by the individual voltage divider resistors are V1', V2', V3', V4' and V5'. It is also assumed that potential levels at terminals of the individual battery cell groups are V1, V2, V3, V4 and V5.

In the reference charging voltage circuit 41, potential V1 at the positive terminal of the battery cell group 30a equals potential V1' at one terminal of the voltage divider resistor 411a of the reference charging voltage circuit 41 and potential V5 at the negative terminal of the battery cell group 30d equals potential V5' at one terminal of the voltage divider resistor 411d of the reference charging voltage circuit 41.

The bypass current control circuit 42 includes operational amplifiers 422a, 422b and 422c for calculation of charging voltage comparison which compare the divided potential levels obtained from the reference charging voltage circuit 41 with potential levels at the junction nodes in battery cell groups 30, operational amplifiers 423a and 423b for comparing outputs of adjacent ones of the operational amplifiers 422a, 422b and 422c, and voltage shift circuits 421a, 421b, 421c and 421d.

The charging current bypass circuit 43 includes protective resistors 431a, 431b, 431c and 431d, and MOSFET's 432a, 432b, 432c and 432d each acting as current control means. The protective resistor 431 is connected in series with the MOSFET 432 to form a series connection and this series connection is also connected in series with another series connection to form the charging current bypass circuit 43.

Terminal voltages across the respective battery cell groups 30a, 30b, 30c and 30d are (V1–V2), (V2–V3), (V3–V4) and (V4–V5), respectively, and it is desirable that terminal voltage across one battery cell group be compared with that of another battery cell group to specify a cell which is insufficiently charged. But disadvantageously, mutual comparison of terminal voltages of the respective battery cell groups requires a large-scale circuit. Accordingly, reference voltages (V1'–V2'), (V2'–V3'), (V3'–V4') and (V4'–V5') generated by the reference charging voltage circuit 41 are compared with terminal voltages of the individual battery cell groups, respectively, and when a terminal voltage of a battery cell group is higher than a corresponding reference voltage, that battery cell group is determined to have higher electromotive force than other battery cell groups.

In this case, an increase in voltage of the battery cell group in question is suppressed by bypassing the charging current for this battery cell group to the charging current bypass circuit 43 in accordance with the magnitude of the electromotive force. By doing so, a larger amount of charging current can be passed to a battery cell group which is charged insufficiently to have a lower terminal voltage than the reference voltage.

Generation of a bypass current for the battery cell group 30a will first be described.

It is now desired that the reference voltage (V1'–V2') produced by the voltage divider resistor 411a be compared with the terminal voltage (V1–V2) of the battery cell group 30a. Therefore, A(V2–V2') is calculated by the operational amplifier 422a and a resulting voltage is added to an operating point voltage of the MOSFET 432a by means of the voltage shift circuit 421a to provide a gate voltage of the MOSFET 432a which in turn controls the MOSFET 432a. "A" referred to herein is a mu-factor of each of the operational amplifiers 422a, 422b and 422c. Although not illustrated, feedback is applied in an actual circuit in order that the mu-factor "A" can be adjusted to a predetermined value.

The MOSFET 432a is allowed to pass current therethrough only when a higher voltage than the operating point voltage is applied to its gate and hence, as the electromotive force (V1–V2) of the battery cell group 30a exceeds the reference voltage (V1'–V2') produced by the voltage divider resistor 411a, a bypass current conforming to a potential difference (V1–V2)(V1'–V2') flows through the MOSFET 432a. As the MOSFET 432a comes into a thorough on-state to decrease drain/source resistance, not only the charging current is bypassed but also the battery cell group 30a to be charged begins to discharge. To cope with this problem, the protective resistor 431a is provided to ensure that a part of the charging current is kept to be alive during bypass operation even when the MOSFET 432a is brought into the thorough on-state.

Next, generation of bypass current for the battery cell group 30b will be described.

It is now desired that the reference voltage (V2'–V3') produced by the voltage divider resistor 411b be compared with the terminal voltage (V2–V3) of the battery cell group 30b and therefore, A(V2–V2') and A(V3–V3') are calculated by the operational amplifiers 422a and 422b, respectively. On the basis of calculation results, the operational amplifier 423a calculates A(V2–V2')–A(V3–V3') which is in turn reduced to A{(V2–V3)–(V2'–V3')}. The mu-factor of the operational amplifier 423a is "1". As a result, a difference between the voltage across the voltage divider resistor 411b and the terminal voltage of the battery cell group 30b can be obtained. In order that a bypass current conforming to the voltage difference can flow through the MOSFET 432b, the output voltage of the operational amplifier 423a is shifted to an operating point voltage of the MOSFET 432b by means of the voltage shift circuit 421b. The protective resistor 431b is also provided to ensure that a part of the charging current is kept to be alive during bypass operation even when the MOSFET 432b is brought into the thorough on-state.

Figure 4:
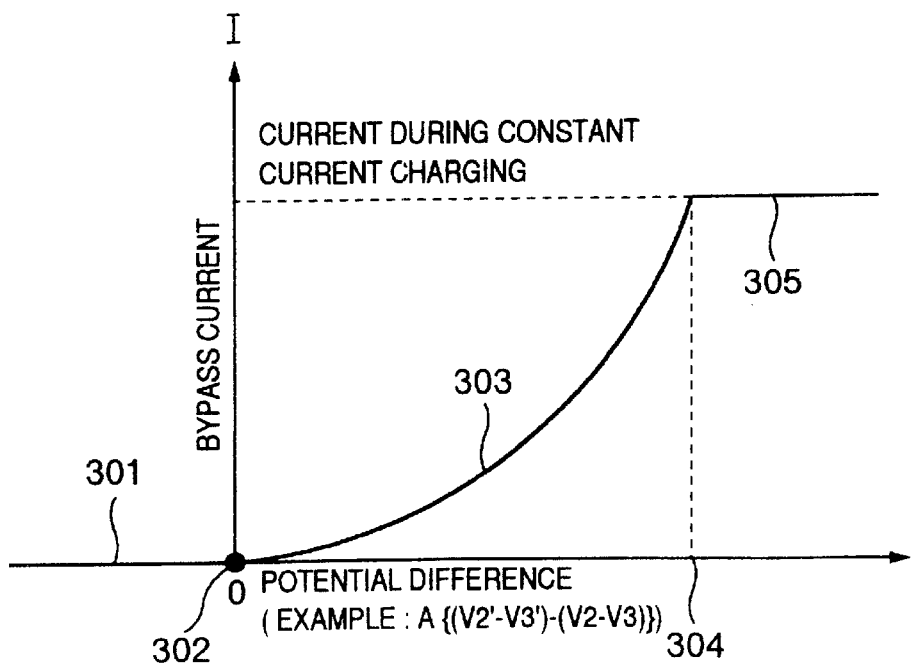
FIG. 4 is a graph showing an example of the behavior of bypass current in the embodiment of FIG. 1.

Referring to FIG. 4, there are illustrated in graphical representation the potential difference obtained by comparing the output of reference charging voltage circuit 41 detected by the bypass current control circuit 42 with the terminal voltage of each secondary battery cell 30 and the magnitude of current bypassed in accordance with the potential difference. Taking the bypass current for the secondary battery cell 30b, for instance, the potential difference is $$\{A(V2'-V2)-A(V3'-V3)\}=A\{(V2'-V3')-(V2-V3)\}$$

as described hereinbefore.

When the potential difference has a negative value, indicating that the secondary battery cell 30b is charged insufficiently, the charging current is not bypassed (301). At the time that the potential difference is 0V, the charging current is proper and is not bypassed, either (302). Next, as the potential difference exceeds 0V, the charging current begins to be bypassed. While the potential difference is small, bypass current is small but as the potential difference increases, the bypass current increases gradually (303). Further, when the potential difference exceeds a predetermined value (304), the FET 432b is brought into the thorough on-state in which a predetermined charging current (305) conforming to the constant current charging operation is passed and the remainder is bypassed.

Next, generation of bypass current for the battery cell group 30c will be described.

It is now desired that the reference voltage (V3'–V4') produced by the voltage divider resistor 411c be compared with the terminal voltage (V3–V4) of the battery cell group 30c and hence, A(V3–V3') and A(V4–V4') are calculated by the operational amplifiers 422b and 422c, respectively. On the basis of calculation results, the operational amplifier 423b calculates A(V3–V3')–A(V4–V4') which in turn is reduced to A{(V3–V4)(V3'–V4')}. The mu-factor of the operational amplifier 423b is "1" and consequently, a difference (V3–V4)–(V3'–V4') between the voltage (V3'–V4') across the voltage divider resistor 411c and the terminal voltage (V3–V4) of the battery cell group 30c can be obtained. In order that a bypass current conforming to the voltage difference can flow through the MOSFET 432c, the output voltage of the operational amplifier 423b is shifted to an operating point voltage of the MOSFET 432c by means of the voltage shift circuit 421c. The protective resistor 431c is also provided to ensure that a part of the charging current is kept to be alive during bypass operation even when the MOSFET 432c is brought into the thorough on-state.

Finally, generation of bypass current for the battery cell group 30d will be described.

It is now desired that the reference voltage produced by the voltage divider resistor 411d be compared with the terminal voltage of the battery cell group 30d and hence, A(V4–V4') is calculated by the operational amplifier 422c. A resulting voltage is added to the operating point voltage of the MOSFET 432d by means of the voltage shift circuit 421b to provide a gate voltage of the MOSFET 432d which in turn controls the MOSFET 432d. "A" referred to herein is a mu-factor of each of the operational amplifiers 422a, 422b and 422c.

Current starts to flow through the MOSFET 432d only when a higher voltage than the operating point voltage is applied to the gate and hence, as electromotive force of the battery cell group 30d exceeds the reference voltage produced by the voltage divider resistor 411d, a bypass current conforming to the potential difference flows through the MOSFET 432d. The protective resistor 431d is also provided to ensure that a part of the charging current is kept to be alive during bypass operation even when the MOSFET 432d is brought into the thorough on-state.

Further, in order to enable the bypass current control circuit 42 to be operated during charging operation only, the charge/discharge protective circuit 20 makes a discrimination between the charge state and the discharge state and delivers the charge/discharge discriminative signal 93 to validate or invalidate the bypass current control circuit 42.

The charge/discharge protective circuit 20 discriminates the charge and discharge states from each other on the basis of the direction of current. More particularly, the charge and discharge states can be discriminated from each other by deciding the direction of a potential difference across a very small resistance such as a protective FET, not shown, which exists between sides of terminal 70 and battery cell groups 30 of the charge/discharge protective circuit 20.

Figure 5:
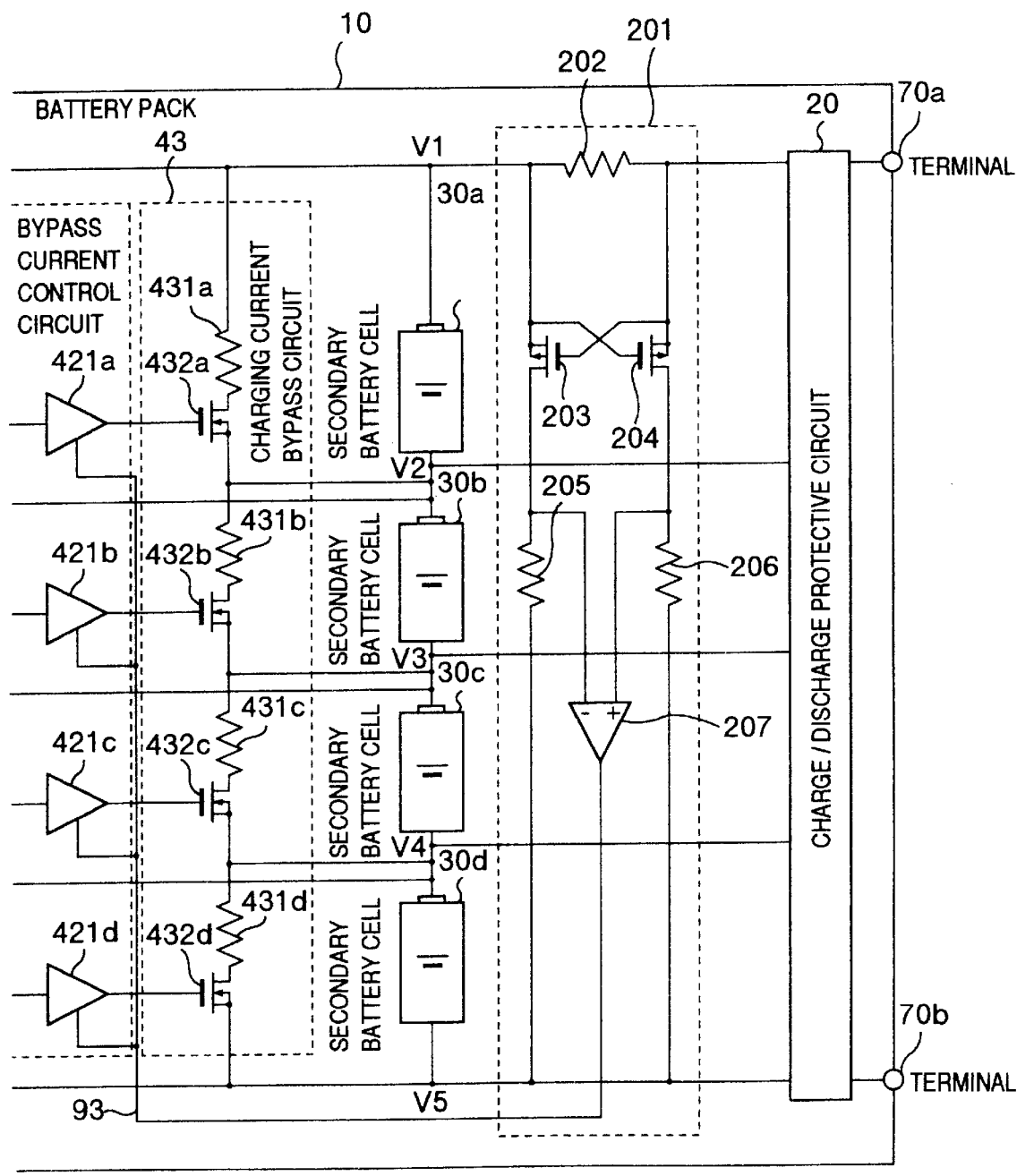
FIG. 5 is a block diagram showing an embodiment of a charge/discharge discriminative circuit according to the invention.

For convenience of explanation, a charge/discharge discriminative circuit 201 is described, by making reference to FIG. 5, as being provided independently or separately between the charge/discharge protective circuit 20 and the secondary battery cells 30a, 30b, 30c and 30d but obviously, it can be provided in the charge/discharge protective circuit 20 integrally therewith as mentioned above.

The charge/discharge discriminative circuit 201 includes a small-resistance resistor 202 for current detection, FET's 203 and 204, high-resistance resistors 205 and 206 acting as voltage/current converters and a voltage comparator 207.

Used as each of the FET's 203 and 204 is a P-channel type FET which has a threshold voltage of 0V so as to pass drain current when gate voltage is lower than source voltage.

During charging operation, current flows through the small-resistance resistor 202 from right to left. Then, a voltage drop occurs across the small-resistance resistor 202 so as to render the gate voltage of the FET 204 lower than the source voltage thereof. As a result, the current flows through the FET 204. In the FET 203, the gate voltage is higher than the source voltage and no current flows through the FET 203.

Consequently, the current flows through the high-resistance resistor 206 but no current flows through the high-resistance resistor 205. voltages across the two high-resistance resistors are compared by the voltage comparator 207 to determine the charging operation when the voltage across the high-resistance resistor 206 is higher.

During discharging operation, current flows through the small-resistance resistor 202 from left to right. Then, a voltage drop occurs across the small-resistance resistor 202 so as to render the gate voltage of the FET 203 lower than the source voltage thereof. As a result, the current flows through the FET 203. In the FET 204, the gate voltage is higher than the source voltage and no current flows through the FET 204.

Consequently, the current flows through the high-resistance resistor 205 and no current flows through the high-resistance resistor 206. Voltages across the two high-resistance resistors are compared by the voltage comparator 207 to determine the discharging operation when the voltage across the high-resistance resistor 205 is higher. Thus, the circuit 201 can generate the charge/discharge discriminative signal 93, 313 and a charging current control circuit invalidating signal 94 to be described later.

The bypass current control circuit 42 can be caused to stop operating by forcibly fixing the output of the voltage shift circuit 421 to the minimum voltage V5 by using the charge/discharge discriminative signal 93 and consequently, all of the MOSFET's 432a, 432b, 432c and 432d are turned off to cause the charging current bypass circuit 43 to stop operating.

In the battery cell group 30, the magnitude of charging current has the proportional relation to the magnitude of increasing rate of electromotive force and hence, by bypassing the charging current for a battery cell group having a high electromotive force level during constant current charging operation by means of the charging current control circuit 40, an increase in the electromotive force can be suppressed and the charging current can be controlled such that electromotive force levels of the individual battery cell groups can be increased uniformly.

In addition, when the electromotive force levels of all of the battery cell groups reach a charging end voltage, the constant current charging operation changes to constant voltage charging operation by the action of an external charging circuit (not shown). During the constant voltage charging operation, the electromotive force is set to be the same for the individual battery cell groups but it happens that charging currents flowing through the individual battery cell groups differ from each other owing to unevenness in characteristics of the individual battery cell groups. Accordingly, the charging current needs to be controlled by detecting a small change in electromotive force. For the reasons as above, in contrast to the constant current charging operation, the mu-factor "A" of each operational amplifier adapted to perform voltage comparison is changed for the purpose of finely controlling the bypass current during the constant voltage charging operation.

Figure 6:
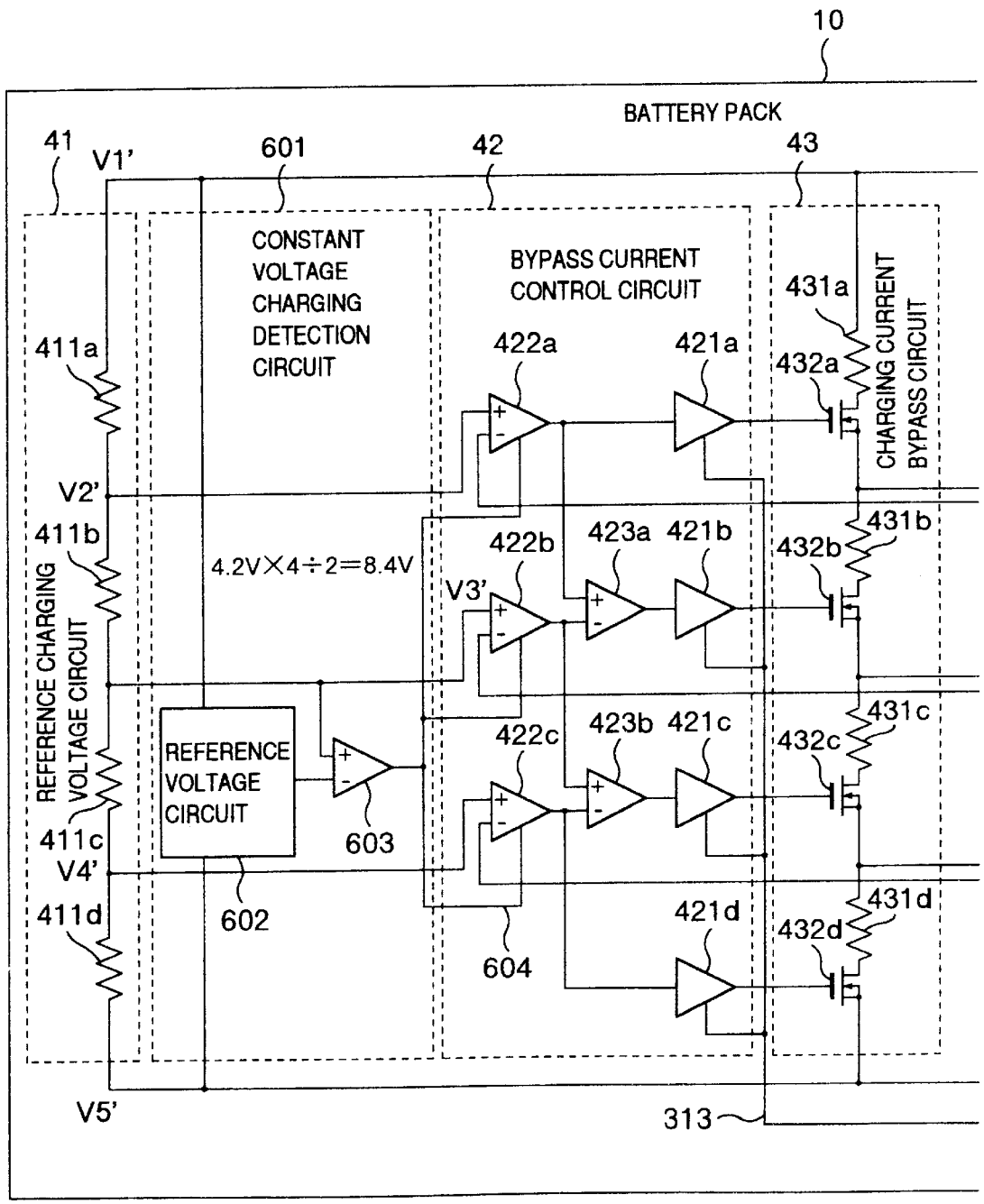
FIG. 6 is a block diagram showing an embodiment of a constant voltage charging discriminative circuit according to the invention.

Referring to FIG. 6, a constant voltage charging detection circuit 601 is exemplified which is inserted between the reference charging voltage circuit 41 and the bypass current control circuit 42.

The constant voltage charging detection circuit 601 includes a reference voltage circuit 602 and a voltage comparator 603 for generating a constant voltage charging detection signal 604.

In this embodiment, the reference voltage circuit 602 delivers a voltage which is half the product of the charging end voltage of the secondary battery cell and the number of series connections. The number of series connections is 4 and given that the charging end voltage of the secondary battery cell is 4.2V, 4.2×4÷2=8.4V is delivered out of the reference voltage circuit 602.

A voltage which is half the entire charging voltage is applied to the voltage comparator 603 from V3' of the reference charging voltage circuit 41 and is compared with 8.4V of the reference voltage circuit 602 to detect switching between constant current charging and constant voltage charging.

This switching is transmitted to the operational amplifiers 422a, 422b and 422c in the form of the constant voltage charging detection signal 604 which in turn is used to switch the mu-factor "A" of each of the operational amplifiers 422a, 422b and 422c.

Since the charging current is controlled in this manner, a charging apparatus for charging the battery assembly unit having the charging current control circuit according to the present embodiment can handle the battery assembly as a single secondary battery in which the electromotive force level corresponds to the number of series connections and the charging current corresponds to the number of parallel connections.

Further, according to the present invention, charging operation can continue until all of the battery cell groups 30 are charged fully and even if the battery cell groups are not uniform in characteristics, the life of the battery assembly as a whole will not be shortened.

According to the present invention, since the charging current is constant during the constant current charging operation, the electromotive force of each battery cell increases as charging proceeds. On the other hand, the charging current decreases as the full charge is approaching during the constant voltage charging operation and as a result, the electromotive force increases at a lower rate during the constant voltage charging operation than during the constant current charging operation.

Accordingly, in contrast to the constant current charging, the mu-factor "A" of each operational amplifier for voltage comparison is made to be changeable during the constant voltage charging for the purpose of finely controlling the bypass current during the constant voltage charging operation.

The constant current charging can be discriminated from the constant voltage charging by either using a signal from an external charger or detecting a voltage which is the product of the charging end voltage of the battery cell group and the number of series connections. In the case where the signal from the external charger is used, there needs a terminal for transmission of this signal. For detection of the voltage represented by the product of the charging end voltage of the battery cell group and the number of series connections, the reference voltage generating source and the voltage comparators may be provided in the battery assembly unit.

In the first embodiment as set forth so far, in order to determine the difference in electromotive force between the battery cell groups, the terminal voltage of each battery cell group is compared with a voltage obtained by uniformly dividing the voltage applied to the whole of battery cell groups but the values of voltages may be compared with each other by means of many voltage comparators or may be digitized by, for example, an A/D converter to provide digital values which are compared by, for example, a microcontroller.

A current equal to the charging current for the entire battery assembly is passed to a battery cell group which does not reach a predetermined electromotive force level but the charging current of the entire battery assembly is bypassed for a battery cell group approaching the predetermined electromotive force level by an amount corresponding to a difference in electromotive force. Through the control operation as above, the battery cell group of higher electromotive force level can be decreased in charging current to suppress an increase in electromotive force so as to wait for an increase in electromotive force of the battery cell group of lower electromotive force level. In other words, according to the present embodiment, the charging current control circuit is so operated as to increase uniformly the electromotive force levels of all of the battery cell groups.

By carrying out the control operation in this manner, any incompletely charged battery cell group is not allowed to exist in the battery assembly and all of the battery cell groups can be charged fully, thereby ensuring that a battery assembly unit of long life can be constructed.

Figure 7:
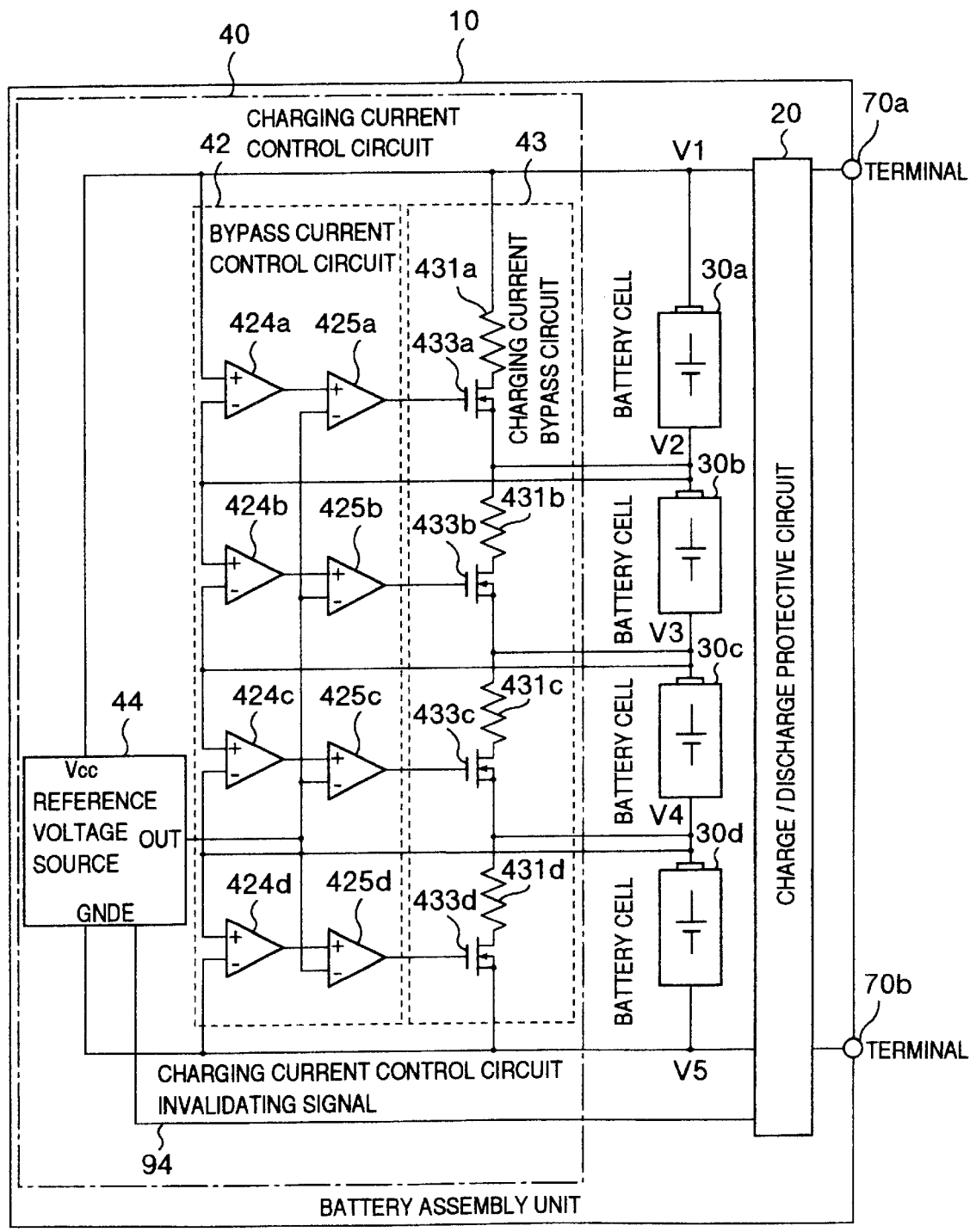
FIG. 7 is a block diagram showing another embodiment of the battery assembly charging current control circuit according to the invention.

Turning now to FIG. 7, a second embodiment of the battery assembly charging current control circuit according to the present invention will be described.

A charging current control circuit shown in FIG. 7 features that comparison circuits for comparing electromotive force levels (terminal voltages) of battery cell groups with a reference voltage are provided in association with the individual battery cell groups and a charging current bypass circuit connected in parallel with a battery cell group reaching a charging end voltage is operated to bypass most of charging current to the charging current bypass circuit.

In the charging current control circuit 40 according to the present embodiment, a bypass current control circuit 42 differs structurally from that of the charging current control circuit 40 of the first embodiment. Further, in the present embodiment, a reference voltage source 44 substitutes for the reference charging voltage circuit 41.

In addition, protective resistors 431a, 431bm 431c and 431d of a charging current bypass circuit 43 in the present embodiment have resistances which are different from those in the first embodiment as will be described later.

The bypass current control circuit 42 in the present embodiment includes operational amplifiers 424a, 424b, 424c and 424d applied with electromotive force levels of individual battery cell groups 30, and voltage comparators 425a, 425b, 425c and 425d for comparing output voltages of the operational amplifiers 424.

Each of the operational amplifiers 424 has an input terminal applied with electromotive force of a battery cell and delivers an output signal proportional to the electromotive force to the voltage comparator 425.

The voltage comparator 425 is applied with the output of the operational amplifier 424 and an output of the reference voltage source 44.

The charging current bypass circuit 43 includes a plurality of series connections each having a protective resistor 431 and a MOSFET 433 serving as switching means and each connected in parallel to a battery cell group 30, the plurality of series connections being connected in series with each other.

The output of the voltage comparator 425 is applied to a gate of the MOSFET 433.

The reference voltage source 44 generates a voltage proportional to the charging end voltage of the battery cell group 30 and delivers the voltage to the individual voltage comparators 425 of the bypass current control circuit 42.

In the bypass current control circuit 42, the operational amplifiers 424a, 424b, 424c and 424d measure electromotive force levels of the battery cell groups 30, respectively, and measurement results are compared with the output voltage of the reference voltage source 44 adapted to generate the charging end voltage by means of the voltage comparators 425a, 425b, 425c and 425d. As the electromotive force of a battery cell 30 exceeds the charging end voltage, the corresponding MOSFET 433a, 433b, 433c or 433d is turned on to cause most of the charging current to bypass that battery cell 30.

Accordingly, the sum of resistance of the resistor 431a and on-resistance of the MOSFET 433a is determined such that a potential difference equal to the charging end voltage is generated by the charging current during the constant current charging operation.

During the constant voltage charging operation, the charging current gradually decreases as the electromotive force of the battery cell group approaches the charging end voltage. Accordingly, when all of the cells approach the charging end voltage, a charge/discharge protective circuit 20 delivers a charging current control circuit invalidating signal 94 so that the charging current bypass circuit 43 may be invalidated and the constant current charging is switched to the constant voltage charging.

During discharging, the charge/discharge protective circuit 20 disables the charging current control circuit 40, that is, invalidates the charging current bypass circuit 43, thereby preventing any circuit responsible for discharge from the battery cell 30 to the charging current control circuit 40 from being formed.

By setting the output of the reference voltage source 44 to the maximum potential V1, the output of each of the voltage comparators 425a, 425b, 425c and 425d falls to a level close to the minimum potential, with the result that all of the MOSFET's are rendered "OFF" to invalidate the charging current control circuit 40.

A signal to make a discrimination as to whether the charging current control circuit 40 is validated or invalidated is the charging current control circuit invalidating signal 94.

Figure 8:
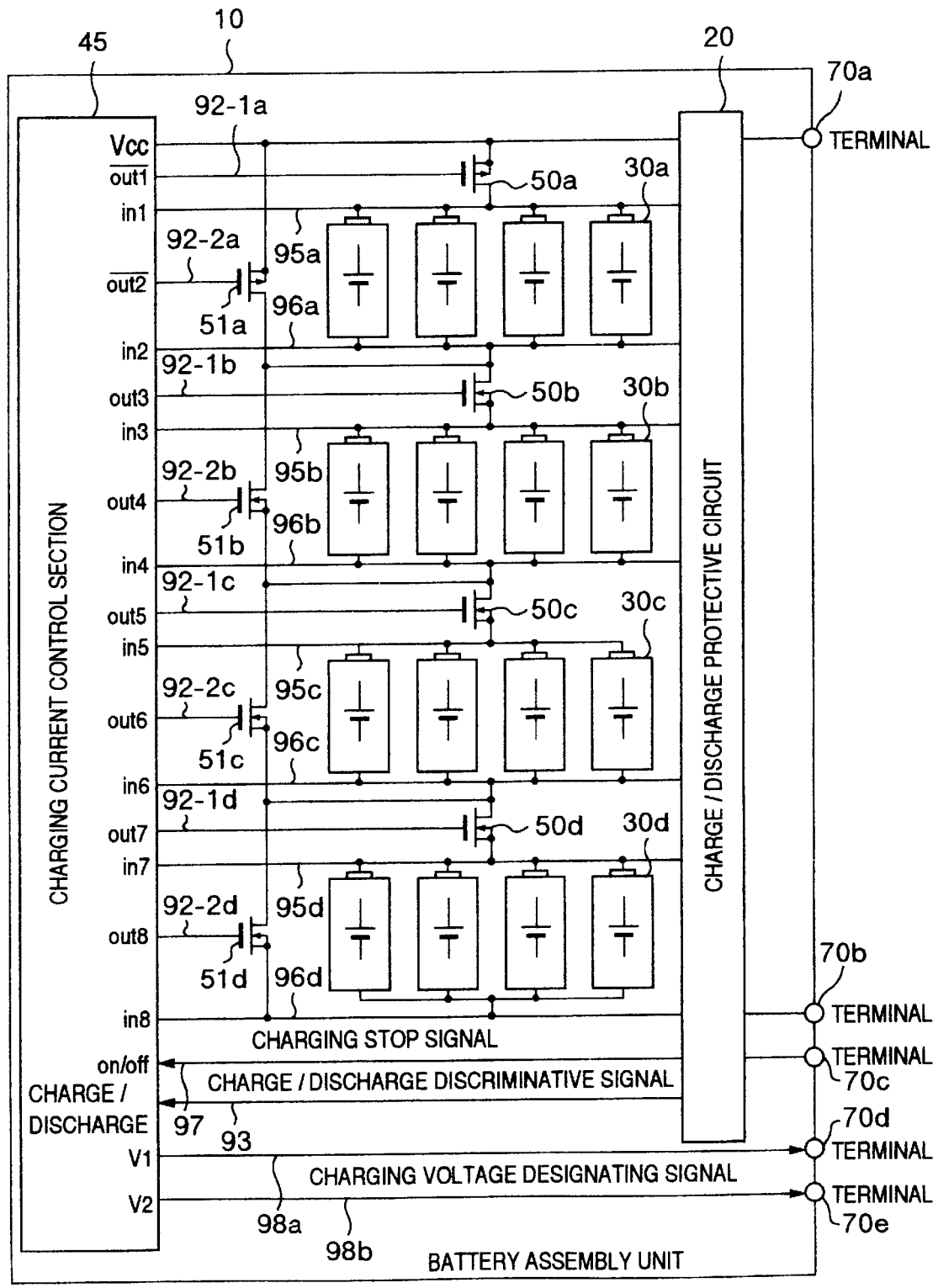
FIG. 8 is a block diagram showing still another embodiment of the battery assembly charging current control circuit according to the invention.
Figure 9:
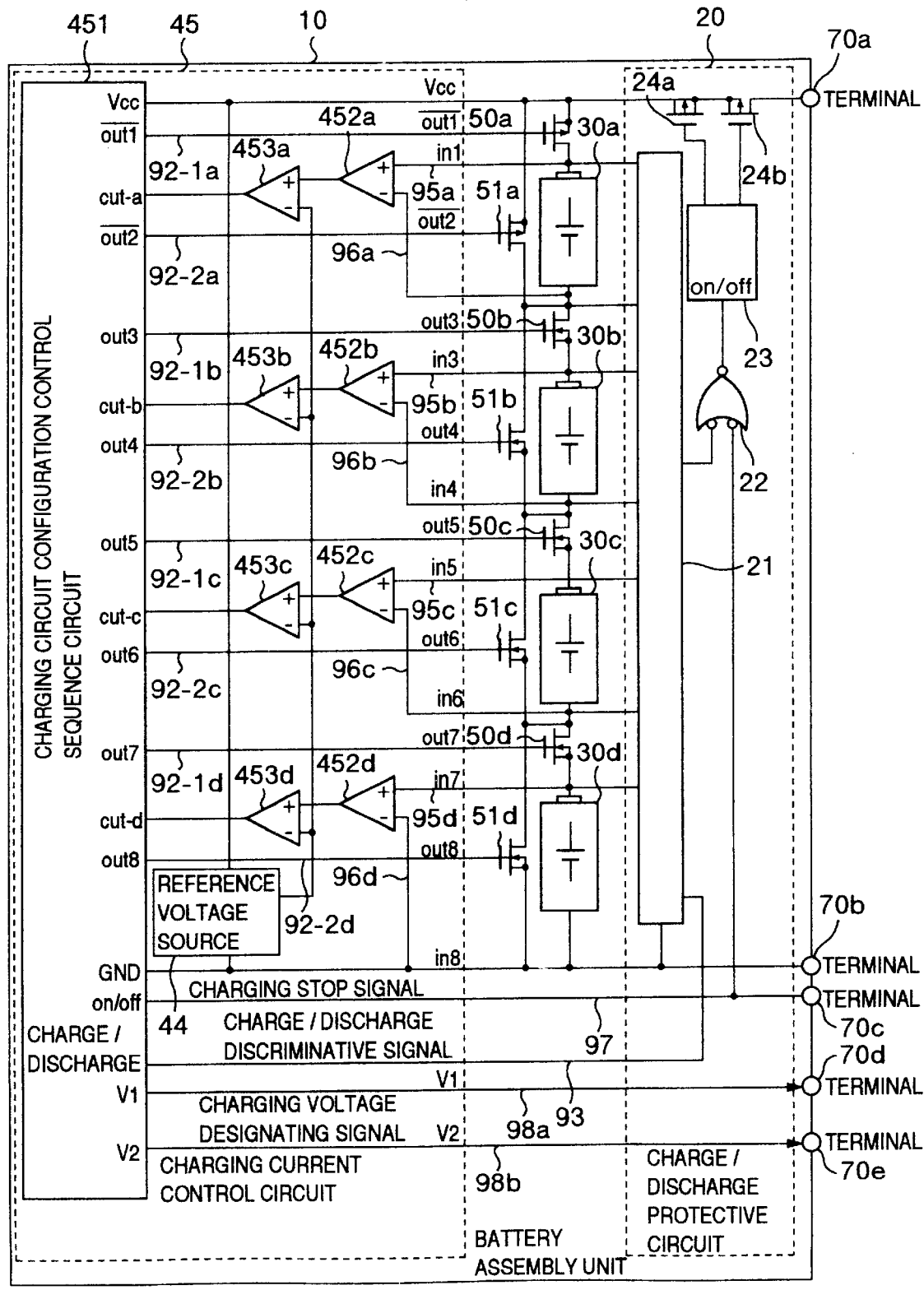
FIG. 9 is a block diagram showing structural details of the embodiment shown in FIG. 8.

Referring to FIGS. 8 to 10, a third embodiment of the charging current control circuit according to the present invention will be described.

The present embodiment features that a battery cell group reaching the charging end voltage is separated from the charging circuit.

As shown in block form in FIG. 8, a battery assembly unit 10 is constructed in which charging circuit configuration changing means capable of changing the configuration of the charging circuit by separating battery cell groups 30a, 30b, 30c and 30d constituting the battery assembly from the charging circuit.

The charging circuit configuration changing means includes charging MOSFET's 50a, 50b, 50c and 50d connected in series with the battery cells 30, respectively, to serve as switching means for controlling charging current to the individual battery cells, charging current bypassing MOSFET's 51a, 51b, 51c and 51d connected in parallel with the respective battery cells 30 to serve as means for bypassing the charging current for the individual battery groups to be charged, and a charging current control section 45 adapted to change the charging circuit configuration by controlling the operation of the FET's acting as control means.

Electromotive force of the respective battery cell groups 30a, 30b, 30c and 30d is applied to the charging current control section 45 through electromotive force monitoring lines 95a, 96a, 95b, 96b, 95c, 96c, 95d and 96d in order that the electromotive force of the individual battery cells 30 can be monitored. Further, on the basis of monitoring results of the electromotive force of the respective battery cells, the charging current control section 45 decides whether the respective battery cells 30 are to be charged and controls output signals to charging circuit configuration control lines 92-1a, 92-1b, 92-1c and 92-1d and charging circuit configuration control lines 92-2a, 92-2b, 92-2c and 92-2d.

For accurate measurement of the electromotive force levels of the respective battery cell groups 30, it is necessary that the electromotive force is not affected by a voltage drop across the charging MOSFET 50 connected in series with each battery cell 30. To this end, there are provided the electromotive force monitoring lines 95a, 95b, 95c and 95d and the electromotive force monitoring lines 96a, 96b, 96c and 96d through which the electromotive force levels (potential levels at the terminals) of the respective battery cells 30 are directly taken out.

Control signals for controlling the charging MOSFET's 50a, 50b, 50c and 50d through which the respective battery cells 30 are charged are delivered to the charging circuit configuration control lines 92-1a, 92-1b, 92-1c and 92-1d.

Control signals for controlling the amount of charging current to be bypassed to the charging current bypassing MOSFET's 51a, 51b, 51c and 51d are delivered to the charging circuit configuration control lines 922a, 92-2b, 92-2c and 92-2d.

Inputted to the charging current control section 45 are a charging stop signal 97 for temporary stop of charging during charging circuit configuration changing operation and a charge/discharge discriminative signal 93 for controlling the operation of the MOSFET's 50a, 50b, 50c and 50d and MOSFET's 51a, 51b, 51c and 51d during charging operation only. Then, the charging current control section 45 delivers charging voltage designating signals 98a and 98b for instructing an external charging circuit (not shown) to supply charging voltage. On the basis of the charging voltage designating signals 98a and 98b, the external charging circuit delivers a predetermined charging voltage.

By making reference to FIG. 9 schematically showing internal structures of the charging current control section 45 and charge/discharge protective circuit 20, the internal structures of these circuits in the battery assembly unit 10 shown in FIG. 8 will be described in greater detail.

In FIG. 9, for simplification of illustration, the parallel connection portion belonging to each battery cell group 30 is omitted.

The charge/discharge protective circuit 20 includes charge/discharge protective means 21, an OR circuit 22, a charge/discharge protective FET driving circuit 23, and charge/discharge protective FET's 24a and 24b connected in series with each other.

The charging current control section 45 includes a charging circuit configuration control sequence circuit 451, operational amplifiers 452a, 452b, 452c and 452d for receiving electromotive force levels of the individual battery cell groups 30, and voltage comparators 453a, 453b, 453c and 453d for comparing outputs of the operational amplifiers 452a to 452d with an output of a reference voltage source 44.

Potential levels at positive and negative terminals of the battery cell group 30a are applied to the operational amplifier 452a through electromotive force monitoring lines 95a and 96a, respectively, so that electromotive force of the battery cell 30a may be measured.

A terminal voltage of battery cell 30a measured by the operational amplifier 452a is compared with a voltage of the reference voltage generating source 44 by means of the voltage comparator 453a and a comparison result is transmitted to the charging circuit configuration control sequence circuit 451.

Preferably, the operational amplifier 452a has a mu-factor of about "1" but generally, the mu-factor of the operational amplifier 452a is determined depending on the relation to the reference voltage generated by the reference voltage source 44.

In other words, the mu-factor is determined such that the output of the operational amplifier 452a when the terminal voltage of the battery cell group 30a reaches the charging end voltage nearly equals the reference voltage generated by the reference voltage source 44. This makes it possible to detect that the output of the battery cell group 30a reaches or approaches the charging end voltage. The mu-factors of other operational amplifiers 452b, 452c and 452d are also determined in a similar way.

The voltage comparator 453a compares the output voltage of the operational amplifier 452a with the reference voltage from the reference voltage source 44 to decide whether the electromotive force of the battery cell group 30a reaches the charging end voltage.

Similarly, electromotive force levels of the battery cell groups 30b, 30c and 30d are measured by the operational amplifiers 452b, 452c and 452d, respectively, measurement results are compared with the reference voltage by the voltage comparison circuits 453b, 453c and 453d, and comparison results are transmitted to the charging circuit configuration control sequence circuit 451.

Electromotive force of the battery cell group 30b is transmitted through electromotive force monitoring lines 95b and 96b and measured by the operational amplifier 452b. A voltage measured by the operational amplifier 452b is compared with the reference voltage generated from the reference voltage source 44 by means of the voltage comparator 453b, and a comparison result is transmitted to the charging circuit configuration control sequence circuit 451.

Electromotive force of the battery cell group 30c is transmitted through electromotive force monitoring lines 95c and 96c and measured by the operational amplifier 452c. A voltage measured by the operational amplifier 452c is compared with the reference voltage generated from the reference voltage source 44 by means of the voltage comparator 453c and a comparison result is transmitted to the charging circuit configuration control sequence circuit 451.

Electromotive force of the battery cell group 30d is transmitted through the electromotive force monitoring lines 95d and 96d and measured by the operational amplifier 452d. A voltage measured by the operational amplifier 452d is compared with the reference voltage generated from the reference voltage source 44 by means of the voltage comparator 453d and a comparison result is transmitted to the charging circuit configuration control sequence circuit 451.

The charging circuit configuration control sequence circuit 451 can be constructed using logical circuits in combination. The circuit 451 receives outputs of voltage comparators 453a, 453b, 453c and 453d which act as signals cut-a, cut-b, cut-c and cut-d for blocking charging current to the battery cell groups 30a, 30b, 30c and 30d and delivers signals out1, out2, out3, out4, out5, out6, out7 and out8 for controlling the charging FET's 50 and charging current bypass FET's 51.

A truth table shown in FIG. 10 shows the relation between the input and output of the charging circuit configuration control sequence circuit 451, where "H" indicates high levels of voltage on input and output sides and "L" indicates low levels of voltage on input and output sides. The level of voltage on the input side may be different from that on the output side.

Sets of the control signals out1 and out2, out3 and out4, out5 and out6, and out7 and out8 delivered out of the charging circuit configuration control sequence circuit 451 are in inverting relationship with each other, respectively.

When the control signals out1, out3, out5 and out7 for controlling the charging MOSFET's 50 are at "H" level, the charging MOSFET's 50a, 50b, 50c and 50d are rendered "ON" and when the control signals out2, out4, out6 and out8 for controlling the charging current bypassing MOSFET's 51 are at "H" level, the charging current bypassing MOSFET's 51a, 51b, 51c and 51d are rendered "ON".

In the embodiment shown in FIG. 8, P-channel MOSFET's are used for only the charging MOSFET 50a and charging current bypassing MOSFET 51a and therefore, only the control signals out1 and out2 are in inverting relationship with other control signals.

The charging circuit configuration control sequence circuit 451 operates during only charging by responding to the charge/discharge discriminative signal 93 detected by the charge/discharge protective means 21. During discharging, the charging circuit configuration control sequence circuit 451 fixes the charging MOSFET's 50a, 50b, 50c and 50d to the "ON" state and the charging current bypassing MOSFET's 51a, 51b, 51c and 51d to the "OFF" state.

Also, the charging circuit configuration control sequence circuit 451 transmits to the external charging unit the charging voltage designating signals 98a and 98b for instructing a charging voltage which conforms to the number of battery cell groups 30 to be charged.

The truth table shown in FIG. 10 indicates that four battery cells 30 are connected in series when the charging voltage designating signals VC1 and VC2 are at "H" and "H" levels, respectively, three battery cells 30 are connected in series when these signals V1 and V2 are at "H" and "L" levels, respectively, two battery cells 30 are connected in series when these signals V1 and V2 are at "L" and "H" levels, respectively, and one battery cell 30 is in series connection when these signals V1 and V2 are at "L" and "L" levels, respectively.

Figure 11:
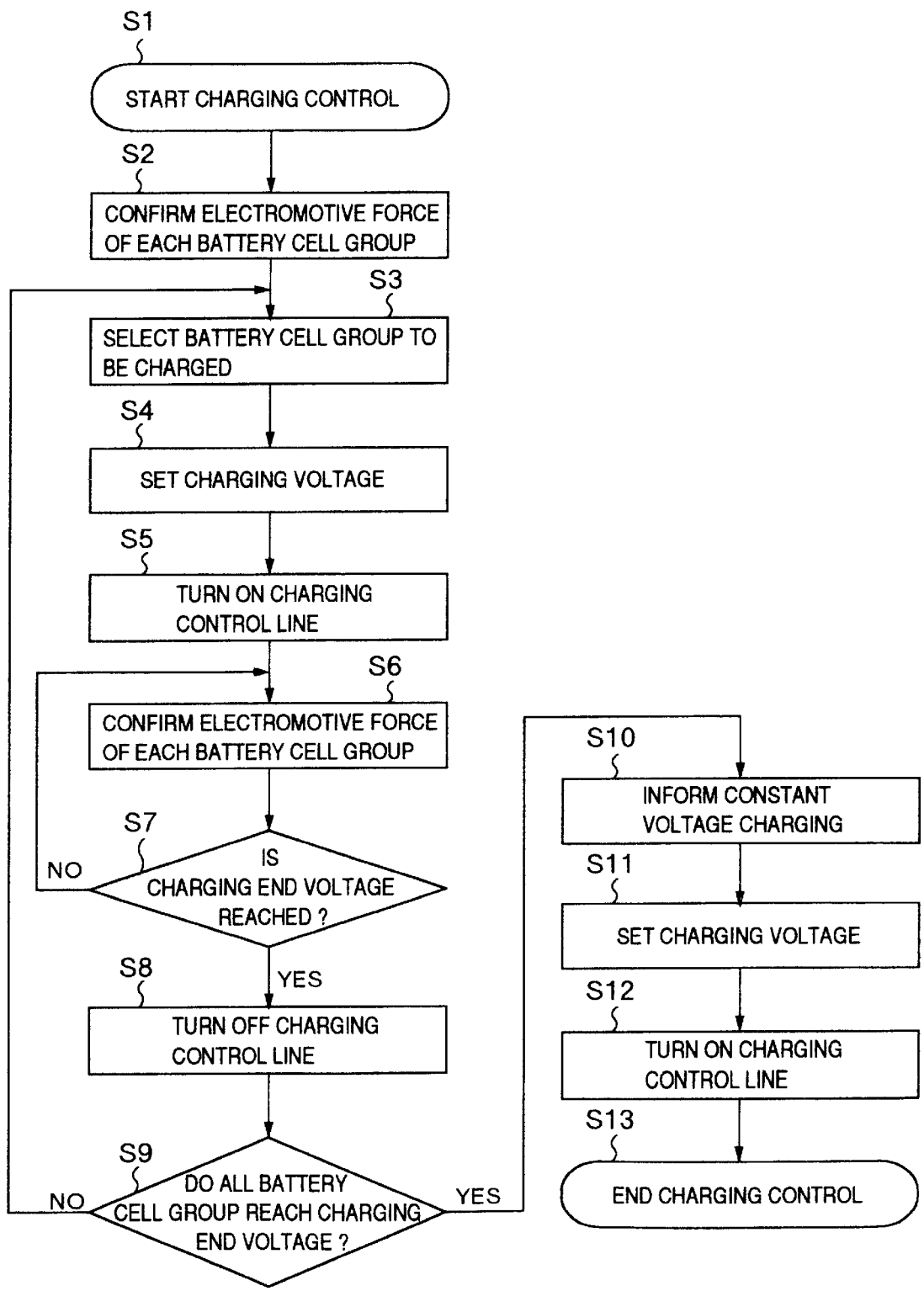
FIG. 11 is a flow chart showing the control procedure in the battery assembly charging circuit shown in FIG. 8.
Figure 12:
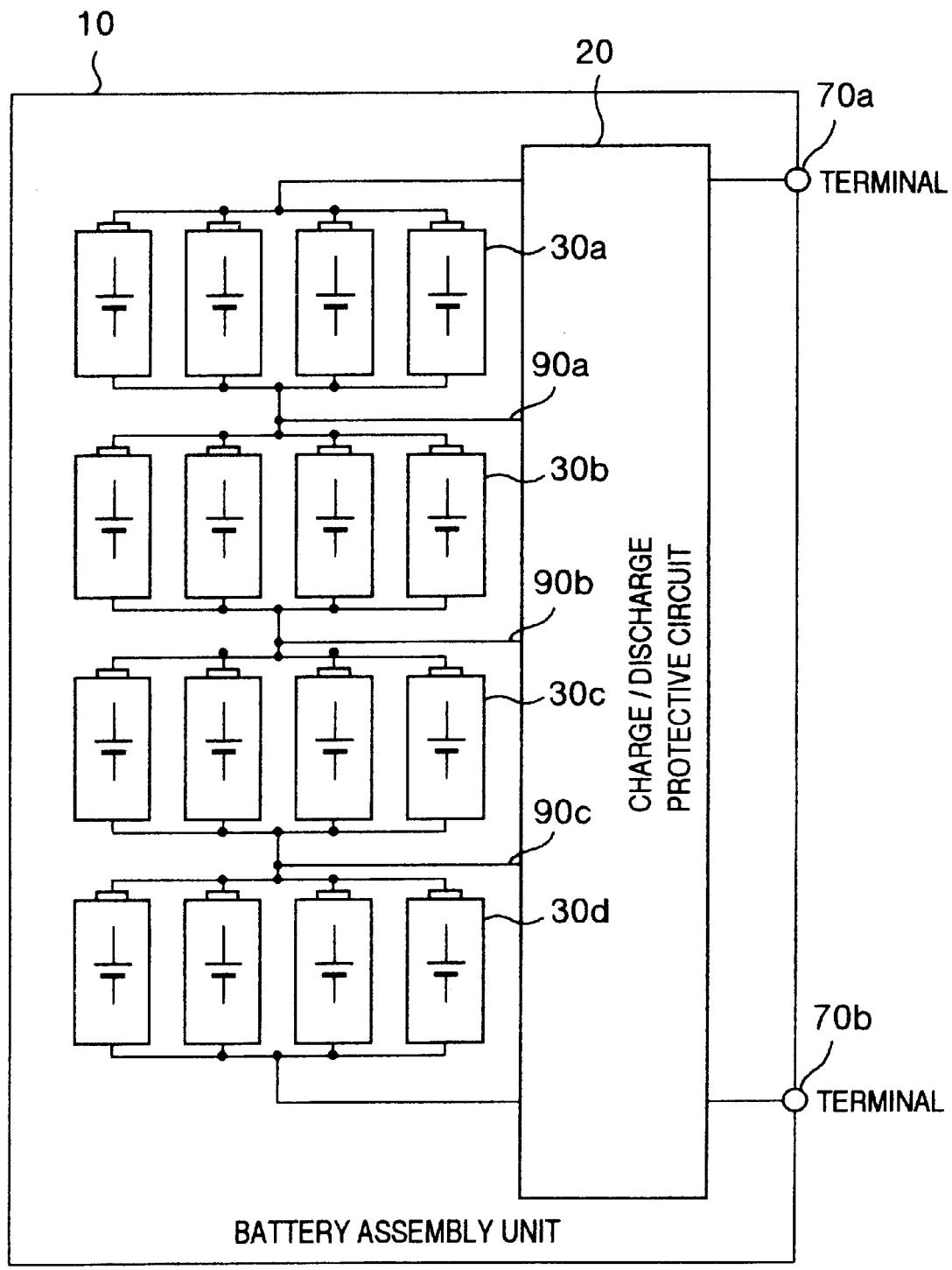
FIG. 12 is a schematic block diagram showing the construction of a conventional battery assembly unit.

Next, by making reference to a control flow chart shown in FIG. 11, the process for charging circuit configuration change of the charging circuit configuration control sequence circuit 451 will be described.

When charging control is started (S1), the charging circuit configuration control sequence circuit 451 first confirms electromotive force levels of the individual battery cell groups (S2), selects battery cells to be charged in accordance with the truth table shown in FIG. 10 (S3) and delivers charging voltage designating signals 98a and 98b conforming to the number of selected battery cells so as to set a predetermined charging voltage in the external charging circuit (S4).

Subsequently, the charging stop signal 87 is released to start charging (S5). Thereafter, confirmation of the electromotive force levels of the individual battery cell continues (S6) and when such a change that the electromotive force of any battery cell reaches the charging end voltage is detected ("Yes" in S7), the charging stop signal 97 is delivered to temporarily stop charging (S8) and it is decided whether all of the battery cells 30 reach the charging end voltage (S9).

When all of the battery cell groups 30 do not reach the charging end voltage ("No" in S9), the program returns to the charging battery cell selection (S3) in order that the configuration of the charging circuit associated with the battery cell reaching the charging end voltage is so changed that charging current can bypass the battery cell reaching the charging end voltage and charging of the insufficiently charged battery cells can continue.

When it is determined by the confirmation in step S9 that all the battery cells 30 reach the charging end voltage, the external charging circuit is informed of the charging voltage designating signals 98a and 98b to shift the charging mode to the constant voltage charging (S10), the charging voltage is set to the maximum level (corresponding to "H" and "H" in the present embodiment) (S11) and the constant voltage charging operation is started (S12).

The constant voltage charging operation is informed in step 10 with the aim of operating the external charging unit on the basis of the charging end voltage detected on the side of the battery assembly unit 10.

Stop or interruption of the charging operation can be effected by either the charge/discharge protective circuit 20 or the external charging circuit. To permit the external charging circuit to perform the interruption, a terminal 70c is provided to ensure that the charging stop signal 97 can also be taken out to the outside.

In order that either charging or discharging is prevented from proceeding when the charge/discharge protective circuit 21 detects abnormality, the charge/discharge protective unit 20 includes the charge/discharge protective MOSFET's 24a and 24b which operate to separate the battery assembly from the outside. Accordingly, to permit the charge/discharge protective MOSFET's 24a and 24b to be also controlled by the charging circuit configuration control sequence circuit 451, the OR circuit 22 and the charge/discharge protective MOSFET driving circuit 23 are provided.

With this construction, in the battery assembly unit in which a plurality of battery cell groups each having a plurality of chargeable batteries connected in parallel are connected in series with each other, charging to a battery cell whose charging is completed is stopped to allow incompletely charged battery cells to be charged cell by cell.

Accordingly, all of the battery cells can be charged thoroughly and a long-life battery assembly unit can be constructed.

In the foregoing description, the cell assembly unit has been described as having the plurality of battery cell groups which are packaged integrally with the charge/discharge protective circuit and charging current control circuit but it does not matter that the present invention is practiced by providing the charge/discharge protective circuit and/or the charging current control circuit independently of the battery cell groups.

As described above, in the course of charging of the battery assembly, the operation of charging a battery cell which has completed its charging can be stopped and the operation of charging a different battery cell which has not completed its charging can continue and therefore, all of the battery cells can be charged fully and the life of the battery assembly unit can be extended.

What is claimed is:

1. A battery assembly in which a plurality of battery cell groups each having battery cells each being rechargeable are connected in series, comprising:

a reference charging voltage circuit for generating reference voltages serving as voltages referenced to a potential difference across the individual battery cell groups on the basis of a charging voltage applied across said battery assembly; and bypass means being connected in parallel across terminals of said plurality of battery cell groups connected in series and, when the potential difference across each battery cell group reaches said charging reference voltage, being operative to bypass charging current due to said charging voltage applied across said battery assembly by an amount conforming to a difference.

2. A battery assembly unit according to claim 1, wherein said reference charging voltage circuit is connected in parallel across said battery assembly to divide said charging voltage applied across said battery assembly by the number of said battery cell groups connected in series to generate said reference voltage.

3. A battery assembly unit according to claim 1 further comprising a bypass current control circuit, wherein, when the potential difference across the battery assembly reaches the charging end voltage, said bypass current control circuit performs bypass control of the charging current in conformity with constant voltage charging.

4. A battery assembly unit according to claim 1 further comprising a charge/discharge discriminative circuit adapted to detect discharging operation of the battery assembly to deliver a discharge discriminative signal to said bypass means, wherein, when receiving said discharging discriminative signal, said bypass means releases the bypass operation of the charging current.

5. A battery assembly unit according to claim 1, wherein said bypass means includes comparison means for comparing a potential difference across each battery cell and said reference voltage, and said bypass means bypasses said charging current when said potential difference across each battery cell exceeds said reference voltage.

6. A battery assembly unit in which a plurality of battery cell groups each having battery cells each being rechargeable and increasable in electromotive force as charging proceeds are connected in series, comprising:

charging interruption means connected in series with one polarity of each battery cell group of said battery assembly;

bypass interruption means connected in parallel with each battery cell group of said battery assembly;

a reference voltage source for generating a charging end voltage of said battery cell group as a charging end reference voltage;

comparison circuits each being connected in parallel across each of said battery cell groups constituting said battery assembly to compare a potential difference across each battery cell group with the charging end reference voltage of said reference voltage source and being operative to deliver a charging end voltage detection signal for each battery cell group when the potential difference across each battery cell group reaches the charging end voltage; and a charging circuit configuration control sequence circuit for receiving the charging end voltage detection signal for each battery cell group from said comparison circuit and delivering a control signal which opens said charging interruption means and closes said bypass interruption means associated with a battery cell reaching the charging end voltage and further delivers to an external power supply a charging voltage designating signal which instructs a charging voltage conforming to the number of battery cells excepting the battery cell reaching said charging end voltage.

7. A battery assembly unit according to claim 6 further comprising, on the battery assembly charging current applying side, charging protective means capable of interrupting charging current and discharging current, wherein said charging circuit configuration control sequence circuit responds to said charging end voltage detection signal to transmit a charging stop signal to said charging protective means so as to temporarily stop the charging current, thereby opening and closing said charging interruption means and said bypass interruption means, respectively, associated with the battery cell group reaching said charging end voltage and thereafter causing said charging protective means to restart conduction of the charging current.

8. A battery assembly unit charging method for applying charging to a battery assembly in which a plurality of battery cell groups each having battery cells each being rechargeable and connected in series, comprising the steps of:

detecting a potential difference across each battery cell group;

generating reference charging voltages for the individual battery cell groups from a charging voltage that it is applied across said battery assembly;

comparing the potential difference across each battery cell group with said reference voltage; and bypassing charging current for a battery cell having a potential difference in excess of said reference voltage in accordance with a difference from said reference voltage.

9. A battery assembly unit charging method for according to claim 8, wherein said reference voltages are generated by dividing the charging voltage applied to said battery assembly by the number of battery cell groups.

10. A battery assembly unit charging method according to claim 8, wherein when the potential difference across a battery cell group reaches a predetermined charging end voltage, charging current for that battery cell group is completely bypassed.

11. A charging current control circuit for applying charging to a battery assembly in which a plurality of battery cell groups each having battery cells and each being rechargeable are connected in series, comprising:

a reference charging voltage circuit for generating charging reference voltages serving as voltages referenced to a potential difference across the individual battery cell groups on the basis of a charging voltage applied across said battery assembly; and bypass means connected in parallel across terminals of each of said plurality of battery cell groups connected in series and, when the potential difference across each battery cell group exceeds said reference voltage, being operative to bypass charging current due to said charging voltage applied across said battery assembly by an amount conforming to the potential difference.

12. A battery assembly unit charging method for applying charging to a battery assembly in a plurality of battery cell groups each having battery cells each being rechargeable and connected in series, comprising the steps of:

measuring a potential difference across each battery cell group;

generating a reference voltage corresponding to a charging end voltage;

comparing the potential difference across each battery cell group with said reference voltage;

separating a battery cell group reaching said reference voltage from said series connection; and performing charging at a charging voltage conforming to the number of remaining battery cell groups.

* * * * *